United States Patent [19]

Hirano

[11] Patent Number: 4,591,908
[45] Date of Patent: May 27, 1986

[54] METHOD AND APPARATUS FOR ADAPTIVE PREDICTIVE ENCODING/DECODING OF MULTI-LEVEL PICTURE SIGNALS

[75] Inventor: Akira Hirano, Tokyo, Japan
[73] Assignee: NEC Corporation, Tokyo, Japan
[21] Appl. No.: 596,742
[22] Filed: Apr. 4, 1984

[30] Foreign Application Priority Data

Apr. 5, 1983 [JP] Japan .................................. 58-59514
Apr. 13, 1983 [JP] Japan .................................. 58-64787

[51] Int. Cl.⁴ ............................................. H04N 7/12
[52] U.S. Cl. .................................................... 358/136
[58] Field of Search ............... 358/133, 135, 136, 138, 358/260, 261

[56] References Cited

U.S. PATENT DOCUMENTS

| | | | |
|---|---|---|---|
| 4,144,543 | 3/1979 | Koga | 358/136 |
| 4,215,374 | 7/1980 | Mizuno | 358/136 |
| 4,307,420 | 12/1981 | Ninomiya et al. | 358/136 |
| 4,400,923 | 7/1984 | Hirano et al. | 358/136 |
| 4,437,119 | 3/1984 | Matsumoto et al. | 358/136 |

OTHER PUBLICATIONS

The Bell System Technical Journal, pp. 631–670, vol. 58, No. 3, Mar. 1979, "Motion–Compensated Television Coding: Part 1" by A. N. Netravli and J. D. Robbins.

*Primary Examiner*—Joseph A. Orsino, Jr.
*Attorney, Agent, or Firm*—Sughrue, Mion, Zinn, Macpeak and Seas

[57] ABSTRACT

In method and apparatus for adaptive predictive encoding and decoding a multi-level television signal, an optimum prediction function of the present picture element time is predicted by taking into consideration the spatial distribution states of optimum prediction functions corresponding to previously encoded reference picture elements. In a modification, for a motion-compensated interframe encoding and decoding method and apparatus, the same principle is applied to a television picture including scene change and motions exceeding a detection range.

8 Claims, 14 Drawing Figures

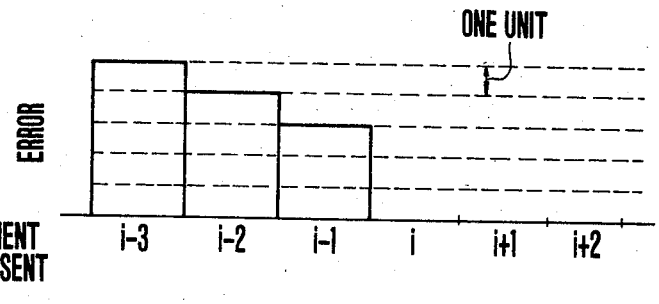
F I G. 1A
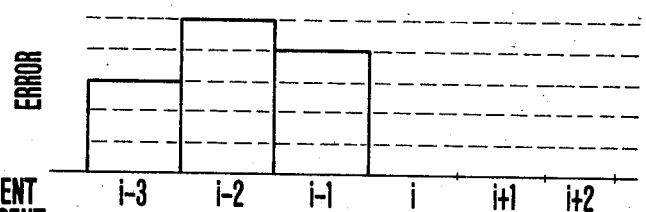
F I G. 1B
| LINE BEFORE PREVIOUS LINE | II | I | I | II | II |
|---|---|---|---|---|---|
| PREVIOUS LINE | II | I | I | II | II |
| PRESENT LINE | II | I | I | X | |
| PICTURE ELEMENT TIMES | i-3 | i-2 | i-1 | i | i+1 |
F I G. 2

|                | | |
|---|---|---|
| PREVIOUS LINE | C | B |
| PRESENT LINE | A | X |

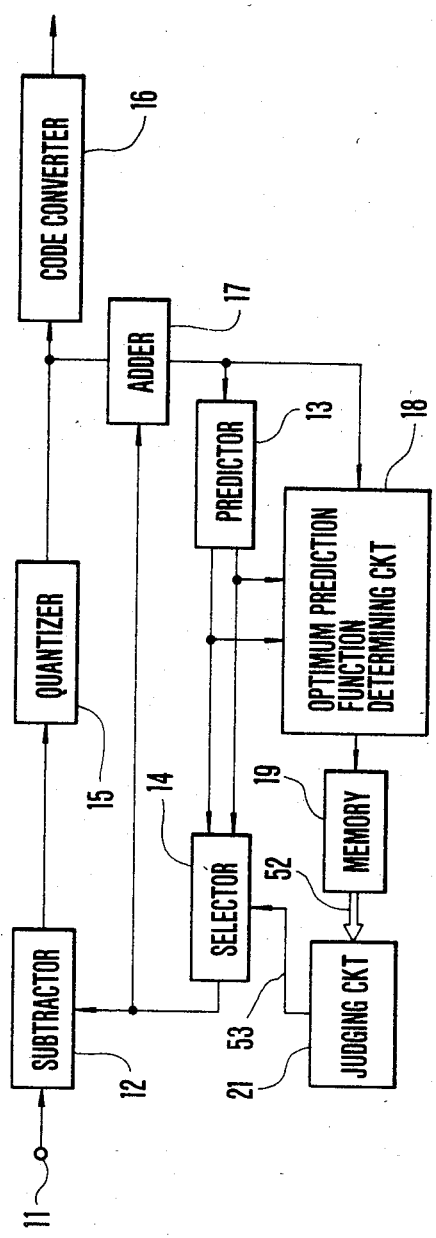
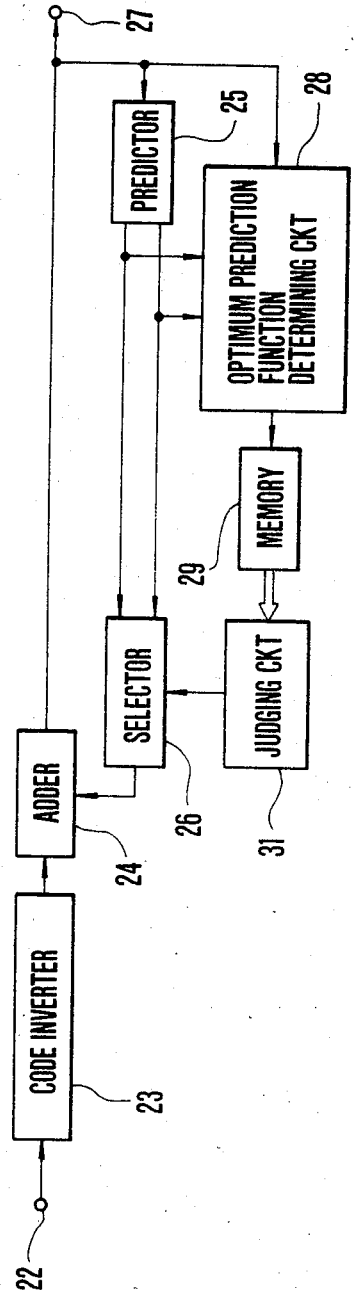
F I G. 5
F I G. 6

| INPUT ADDRESS | | | OUTPUT |
|---|---|---|---|
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

METHOD AND APPARATUS FOR ADAPTIVE PREDICTIVE ENCODING/DECODING OF MULTI-LEVEL PICTURE SIGNALS

BACKGROUND OF THE INVENTION

This invention relates to method and apparatus for adaptive predictive encoding/decoding of multi-level picture signals, and more particularly to method and apparatus for adaptive predictive encoding/decoding in which a plurality of prediction functions are adaptively switched in accordance with the nature of a picture.

The invention also relates to method and apparatus of motion-compensated interframe encoding and decoding of a television signal for preventing decrease in the encoding/decoding efficiencies caused by scene change.

When predicting multi-level picture signals, typically television picture signals, there are many methods including (1) a case wherein a single prediction function is continuously used, (2) a case wherein a combination of several prediction functions are combination used, and (3) a case wherein a plurality of prediction functions are adaptively switched in accordance with the nature of a picture.

Among types of the last mentioned adaptive predictive method wherein prediction is made by switching a plurality of prediction functions, there are available a method in which a block is formed of a plurality of picture element units, an optimum prediction function is detected in a block unit, and a code representing the optimum prediction function used and a prediction error at that time are transmitted simultaneously, and a method wherein only information corresponding to encoded picture elements is utilized to investigate a local nature of a picture signal for estimating an optimum prediction function of the next picture element. With the latter method, since it is possible to make similar estimation on the receiving side, there is no need of transmitting a code representing the prediction function used, thereby simplifying the circuit construction. This invention relates to the latter type method.

Where only the result of a judgment, at the time of a current picture element, is used for the purpose of estimating an optimum prediction function at the next picture element time, an abnormal prediction error occurs. This error is different from a prediction error obtained from surrounding picture elements. Specifically, a so-called "isolated point" appears which has a large prediction error not withstanding the fact that surrounding prediction errors are small. The isolation point results in errors in the estimation of the optimum prediction functions. Such phenomena are liable to occur in signals on which random noises are superposed. If an optimum prediction function utilized in such a case can be confirmed two-dimensionally, correct estimation would become possible without being strongly affected by the presence of an isolated point.

This will be described with reference to FIGS. 1A and 1B. Let us assume now that two prediction functions I and II are used. Where a picture element signal now being inputted runs on a scanning line displayed on a screen at a time i, it is assumed that the prediction errors pursuant to the prediction function (I) at picture element times i−3, i−2 and i−1 on the scanning line under consideration are 5, 4 and 3, respectively, as shown in FIG. 1A it also is assumed that the prediction errors are 3, 5 and 4 as shown in FIG. B when the prediction function (II) is used. The optimum functions at picture element times i−3, i−2 and i−1 along the present scanning line are functions II, I and I respectively as shown in a row entitled "present" line in FIG. 2. This shows the optimum prediction functions for the encoded picture elements. For each picture element time, one of the two prediction functions (I) and (II) is considered optimum because it is assumed to be attended by a small prediction error.

Since the optimum prediction function at the previous picture element time i−1 is (I), the prediction function X at the present picture element time i would be estimated as (I) if only the result of a judgement on the previous picture element time is used. A matrix of optimum prediction functions at each of several picture element times (i, i+1, i−1, etc.) for each of several picture lines (present, previous, next previous) are shown in FIG. 2. It can be readily understood by examining a pattern of functions (I) and (II) occurring in a vertical direction at the picture element time i that the prediction function (II) is more estimable than the prediction function (I) at the picture element time i.

The phonemenon that the optimum prediction function changes abruptly usually occurs at the contour portions of a picture. Since, at the contour portions, the brightness becomes discontinuous, it is necessary to estimate the optimum prediction function in relation to surrounding conditions. Usually, since a picture contains a large number of contour portions, it is of particular significance to utilize the relation with respect to the surrounding conditions. In the digital transmission of television signals, an interframe encoding system is used wherein a difference signal between adjacent frames (hereinafter called a frame difference signal) is encoded and transmitted to ensure that the number of transmission bits can be greatly reduced as comapred to a based on ordinary pulse code modulation (PCM). Especially, the interframe encoding system permits attainment of a high compression ratio (the ratio of decreasing the transmission bit numbers with respect to PCM) for a still picture or a picture of less movement. In a picture including a large movement, however, the compression ratio decreases due to a large frame difference signal. For the purpose of ensuring a high compression ratio even for a picture including a large movement, a motion compensated interframe encoding system has been proposed. According to this system, a motion of a television signal is detected to generate a prediction signal compensating the motion of the television signal, and the prediction signal is utilized for effective predictive encoding.

FIG. 11 shows an object which was at a point B' (section (a)) in the previous frame has moved to a point A (section (b)) in the present frame. In the motion compensated interframe encoding system, a displacement $\vec{v}$ (which is termed a motion vector) between point A' at the same position on a televison screen as point A in the present frame and point B' is determined, and as the prediction signal of the signal value $Y(\vec{r})$ of point A in the present frame is used the signal value $Y'(\vec{r}+\vec{v})$ instead of the signal value $Y'(\vec{r})$ at point A' which is the prediction signal in the case of a simple interframe encoding. In this discussion, $\vec{r}$ is a position vector showing a position on a television screen.

A prediction error signal $Y(\vec{r})-Y'(\vec{r}+\vec{v})$ in the motion-compensated interframe encoding system has a much smaller value than the prediction error signal $\vec{Y(r)} - \vec{Y'(r)}$ of the simple interframe encoding system so that with the motion-compensated interframe encoding system, an efficient encoding can be made even for a picture including a large motion.

The method of detecting the motion vector may use a method disclosed in U.S. Pat. No. 4,307,420 to Ninomiya et al, issued Dec. 22, 1981. According to this method, a television signal is divided into a plurality of blocks, the degree of similarity between a television signal of each block in a previous frame at a position displaced by a displacement (which is termed a shift vector relative to a reference at the same position on the television screen) and a television signal of each block in the present frame is evaluated, and a shift vector for the block in the previous frame showing the highest degree of similarity is detected as the motion vector. As the evaluation value for judging the degree of similarity may be used the sum of the absolute values of the differences between signals of the blocks in the present frame and the signals of the blocks in the previous frame shifted by one shift vector or a number of difference signals whose absolute values exceed a predetermined threshold values.

Although the principle and advantage of the motion-compensated interframe encoding system have been described, this system has the following disadvantages.

More particularly, according to the motion compensated encoding system, the number of the transmission bits can be decreased by utilizing a high degree of correlation of television signals between adjacent frames in the same manner as the interframe encoding system. However, when there is no correlation between adjacent frames, for example, at the time of scene change, it becomes impossible to accurately predict the present frame signal from the previous frame signal, thus generating a large amount of information.

In a practical motion-compensated interframe encoding apparatus, the number of the shift vectors can not be infinite and it is inevitable to limit the ranges of movement that can be detected (called a detection range). For this reason, it is impossible to accurately predict the present frame signal from the previous frame signal when a television signal containing motions beyond the detection range is inputted, thus decreasing the encoding efficiency.

SUMMARY OF THE INVENTION

It is an object of this invention to provide a novel method and apparatus for the adaptive predictive encoding and decoding of a multi-level picture signal capable of increasing the accuracy of prediction, thereby to improve the efficiency of prediction encoding and decoding and consequently to decrease the amount of information to be transmitted or recorded.

Another object of this invention is to provide improved method and apparatus for motion compensated interframe encoding and decoding capable of efficiently encoding and decoding a television picture at the time of scene change or when the television picture contains motions beyond a detection range.

According to one aspect of this invention, there is provided an adaptive predictive encoding/decoding method of a multi-level picture signal applicable to an adaptive predictive encoding/decoding system wherein, on a transmission side, a single prediction signal estimated as an optimum signal among prediction signals generated pursuant to a plurality (M) of prediction functions is adaptively, selected, and the multi-level picture signal is predictively encoded by using the selected prediction signal; and on the receiving side, the multi-level picture signal is predictively decoded by procedures opposite to those on the transmission side;

said method comprising the steps of:

utilizing a plurality (N) of picture elements previously encoded and located near the present picture element to be encoded at the present time as reference picture elements;

detecting which one of said M prediction functions is an optimum prediction function based on a prediction error with reference to each reference picture element;

forming $M^N$ reference picture element states based on results of detections of N picture elements;

selecting, when determining a prediction signal for the present picture element on the basis of the reference picture element states one prediction function which becomes an optimum prediction function at a high degree of probability in each reference picture element state, thereby causing each of said $M^N$ states to one to one correspond to the prediction function for the present picture element at least before the present time; and determining the prediction function utilized for the present picture element in accordance with said one to one correspondence when any one of said reference picture element states occurs.

According to another aspect of the invention, there is provided adaptive predictive encoding apparatus of a multi-level picture signal wherein one prediction signal estimated as an optimum prediction signal is adaptively selected for each picture element among prediction signals generated pursuant to a plurality (M) of prediction functions, and predictively encoding said multi-level picture signal by utilizing the selected prediction signal, said apparatus comprising:

means for producing a plurality (M) of prediction signals;

means for selecting a single prediction signal out of said M prediction signals;

means for encoding a prediction error signal between said selected prediction signal and said multi-level picture signal;

means for locally decoding said multi-level picture signal in accordance with said prediction error signal and said selected prediction signal;

means for generating a signal representing an optimum prediction function having a minimum difference between each of said M prediction signals and said locally decoded multi-level picture signal;

means for producing a group of signals representing $M^N$ reference picture element states from said optimum prediction function signal generating means said group of signals being foumed by signals showing said optimum prediction functions of a plurality (N) of reference picture elements which have already been encoded and located close to the present picture element to be encoded at the present time, and for one to one corresponding each of said $M^N$ states to a prediction function estimated to be optimum for the present picture element at a high degree of probability at least before the present time; and control means for determining a prediction function utilized for the present picture element in accordance with said one to one correspondence and said group of signals representing said reference picture element states, thereby causing said selecting means to select a prediction signal generated pursuant to the thus determined prediction function.

According to still another aspect of the invention, there is provided adaptive predictive decoding apparatus wherein one prediction signal is adaptively selected for each picture element amang prediction signals generated pursuant to a plurality (M) of prediction functions and an adaptively and predictly encoded multilevel picture signal is predictively encoded by utilizing said selected prediction signal, said apparatus comprising:

means for producing M prediction signals;

means for selecting a single prediction signal among said M prediction signals;

means for decoding a multi-level picture signal in accordance with said selected prediction signal and said predictively encoded multi-level picture signal;

means for generating a signal representing an optimum prediction function having a minimum difference between each of said M prediction signals and said decoded multi-level picture signal;

means for producing a group of signals representing $M^N$ reference picture element states from said optimum prediction function signal generating means said group of signals being formed by signals showing said optimum prediction functions of a plurality (N) of reference picture elements which have already been decoded and located near the present picture element to be decoded at the present time, and for one to one corresponding each of said $M^N$ states to a prediction function estimated to be optimum at a high degree of probability for the present picture element at least before the present time; and control means for determining a prediction function utilized for the present picture element in accordance with said one to one correspondence and said group of signals representing said reference picture element states, thereby causing said selecting means to select a prediction signal generated pursuant to the thus determined prediction function.

According to still another aspect of the invention, there is provided a method of motion-compensated interframe encoding and decoding comprising the steps of:

on a transmission side, selecting a motion-compensated prediction function having a high encoding efficiency of at least one picture element for a motion of a television signal among a plurality of prediction functions having different encoding efficiencies depending upon direction and magnitude of the motion of the television signal, each of said prediction functions generating a prediction signal by using locally decoded signals of picture elements presenting in picture frames preceding a frame in which the present picture element to be encoded at the present time exists;

detecting which one of said (M+1) prediction functions is the optimum prediction function for each of N reference picture elements by using a prediction error as a reference, a plurality (N) of previously encoded picture elements near said present picture elements being used as said N reference picture elements for the present picture element, whereby, for each picture element, a prediction function estimated to be optimum is adaptively selected among (M+1) prediction functions prepared from M in-frame prediction functions which present in the same frame said present picture element and generate prediction signals in acordance with locally decoded signals of previously encoded picture elements, and said motion-compensated prediction function determined for said at least one picture element;

preparing reference picture element states representing $(M+1)^N$ states from results of said detections for said N picture elements, thus determining a prediction function utilized for the present picture element, wherein, for each of said $(M+1)^N$ states and said prediction function for said present picture element, a prediction function which becomes, at a high probability, the optimum prediction function for respective states, so as to one to one correspond each of said $(M+1)^N$ states to said prediction function for the present picture element at least before the present time;

determining a prediction function utilized for the present picture element in accordance with said one to one correspondence when any one of said reference picture element states occurs;

predictively encoding said television signal by using a prediction signal generated pursuant to the thus determined prediction function; and on a receiving side, determining a prediction function utilized for the present picture element among (M+1) prediction functions including said motion-compensated prediction function of said at least one picture element and said M in-frame prediction functions, according to substantially the same processings as those utilized on the transmission side; and predictively decoding said television signal by using a prediction signal generated pursuant to the thus determined prediction function.

According to still another aspect of the invention, there is provided apparatus for effecting motion-compensated interframe encoding comprising:

means for detecting a motion of a television signal by using at least one picture element;

means for generating a motion-compensated prediction signal, the motion thereof being compensated for by a motion-compensated prediction function determined by said detected motion;

means for generating M in-frame prediction signals in accordance with locally decoded values of picture elements contained in the same frame as the present picture element to be predictively encoded at the present time, said Min-frame prediction signals having M in-frame prediction functions;

means for selecting a prediction signal among (M+1) prediction signals including said motion-compensated prediction signal and said M in-frame prediction signals;

means for predictively encoding said television signal by encoding a prediction error signal between said selected prediction signal and said television signal;

means for locally decoding said television signal in accordance with said selected prediction signal and said prediction error signal;

means for producing a signal representing an optimum prediction function given to a prediction signal selected from said (M+1) prediction signals for said television signal, and having a small difference with respect to said locally decoded television signal;

means for producing a group of signals representing $(M+1)^N$ reference picture element states which are formed by signals representing said optimum prediction functions for respective reference picture elements comprising a plurality (N) of previously encoded picture elements located close to said present picture element;

means for one to one corresponding each of said $(M+1)^N$ states to a prediction function estimated to be optimum at a high probability for the present picture element, at least before the present time; and control means for determining a prediction function utilized for the present picture element according to said one to one correspondence and for causing said selecting means to select a prediction signal generated pursuant to said prediction function thus determined.

According to still another aspect of the invention, there is provided a motion compensated interframe decoding apparatus wherein a prediction signal is adaptively selected for each picture element from a motion-compensated prediction signal prepared by compensating for a motion of a television signal by using a picture element and decoded signals of picture elements located in the same frame as the present picture element to be predictively decoded at the present time, and the predictively encoded television signal is predictively decoded by using said selected prediction signal, said apparatus comprising:

means for producing (M+1) prediction signals including said motion-compensated prediction signal and said M in-frame prediction signals;

means for selecting one prediction signal among said (M+1) prediction signals;

means for predictively decoding said television signal in accordance with said predictively encoded television signal and said selected prediction signal;

means for producing an optimum prediction signal given with a prediction signal selected from said (M+1) prediction signals corresponding to said decoded television signal and having a small difference with respect thereto;

means for generating a group of signals representing $(M+1)^N$ reference picture element states, said group of signals being outputted from said means for generating said signal representing the optimum prediction functions and formed by signals representing said optimum prediction functions of a plurality (N) of previously encoded reference picture elents located near said picture elements;

means for one to one corresponding each of said $(M+1)^N$ states and a prediction fucntion estimated to be optimum, at a high probability, for the present picture element, a least at the present time; and control means, which when a group of signals representing one of said referece picture element states is inputted, one to one corresponds each one of said $(M+1)^N$ states to said prediction function for the present picture element, whereas when another signal group representing another of said reference picture element states is inputted, determines a prediction function utilized for the present picture element according to said one to one correspondence so as to cause said selecting means to select a prediction signal generated pursuant to the prediction function thus determined.

BRIEF DESCRIPTION OF THE DRAWINGS

Further objects and advantages of this invention can be more fully understood from the following detailed description taken in conjunction with the accompanying drawings, in which:

FIGS. 1A and 1B are graphs showing examples of prediction errors according to two types of prediction methods;

FIG. 2 is a table showing one example of a spatial distribution of the optimum prediction functions;

FIG. 3 is a table showing one example of arrangement of reference picture elements;

FIG. 4 illustrates in sections (1) through (8) examples of measurement of probabilities in which a prediction function becomes an optimum prediction function in the present picture element for various combinations of optimum prediction functions of the reference picture elements;

FIG. 5 is a block diagram showing one embodiment of the prediction encoding apparatus according to this invention;

FIG. 6 is a block diagram showing one embodiment of the decoding apparatus for decoding information encoded by the encoding apparatus of this invention;

DESCRIPTION OF THE PREFERRED EMBODIMENTS

Figures 7, 8:
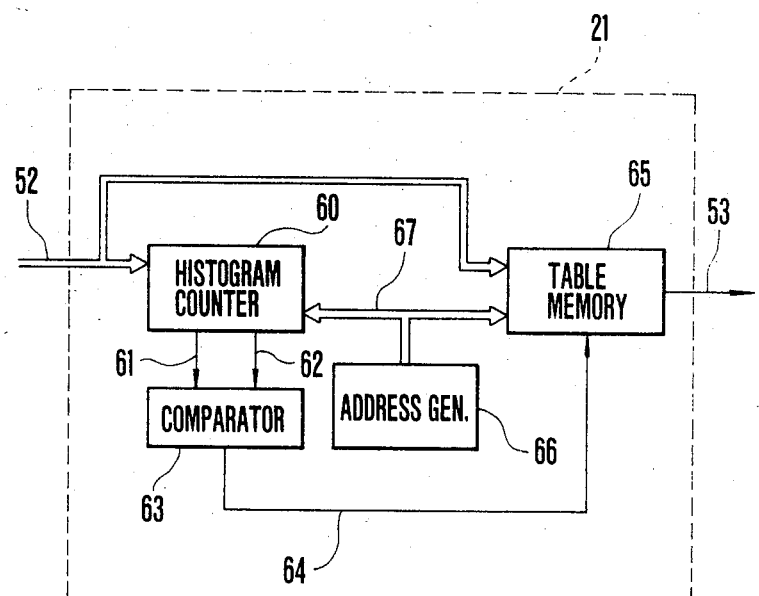
FIG. 7 is a table showing one example of the inputs and outputs of the judging circuits 21 and 31 shown in FIGS. 5 and 6.
FIGS. 8, 9 and 10 are block diagrams showing the construction and operation of the judging circuits 21 and 31 used in modified embodiments of this invention.

A method of estimating an optimum prediction function of the present picture element based on the current prediction functions of the reference picture elements will be described in detail with reference to FIGS. 3 and 4. FIG. 3 shows one example of the arrangement of reference picture elements, in which X represents the position of the present picture element, and A, B and C represent the position of the reference picture elements. Within one frame, the picture elements A and X are on the present scanning line, and the picture elements C and B are on the previous scanning line. In the following description, it is assumed that two types of prediction functions (I) and (II) are used and that the optimum prediction function of the present picture element X is estimated based upon the optimum prediction functions of the reference picture elements A, B and C, that is the reference picture element states.

Where there are three reference picture elements, eight conditions would occur as shown at sections (1) through (8) in FIG. 4, where "0" shows that the prediction function (I) is the optimum prediction function for respective reference picture elements, while "1" shows that the prediction function (II) is the optimum prediction function. According to this invention, the probability for each of the respective eight conditions that the prediction function (I) or (II) becomes the optimum prediction function for the present picture element (in which the prediction error becomes smaller than others) is measured beforehand. More particularly, independent counting of the number of picture elements corresponding to the present picture element which take the prediction function (I) and (II) as the optimum prediction function under respective eight conditions is measured in advance.

In the following description, it is assumed that the probability that the prediction function (I) becomes the optimum prediction function in each condition as a result of such measurement is denoted by a value $P_I$ shown at (1) to (8) in FIG. 4.

According to this invention, where $P_I$ becomes large (for example, $P_I \geq 0.5$, as shown in sections (1), (2) and (5)), the prediction function (I) is estimated as the optimum prediction function for the present picture element and in the other cases, the prediction function (II) is estimated as the optimum prediction function for the present picture element. Where the prediction function applied to the present picture element is estimated in this manner, the optimum prediction function can be estimated at a high probability.

For example, when, in the examples shown in FIG. 4, the prediction function (I) is used for the present picture element under the conditions of sections (1), (2) and (5), the probability that permits correct choice of the optimum prediction function measures 0.97, 0.75 and 0.80. When the prediction function (II) is used for the present picture element under the conditions shown at (3), (4), (6), (7) and (8) in FIG. 4, the probability that permits correct choice of the optimum prediction function measures 0.80, 0.75, 0.55, 0.85 and 0.98. Where the conditions (1) through (8) occur at the same probability, the present method ensures that the optimum prediction function can be correctly selected at a probability of (0.97+0.75+0.80+0.80+0.75+0.55+0.85+0.98)/8 = 0.806, that is, at a high probability of more than 80%. As described above, prediction encoding can be made at a high probability for a multi-level picture signal.

One embodiment of the predictive encoding apparatus of this invention will be described with reference to the accompanying drawings. FIG. 5 shows the simplest embodiment utilizing two types of prediction functions. More particularly, a multi-level picture signal inputted to an input terminal 11 is supplied to a subtractor 12 which also receives one of the prediction signals selected by a selector 14. Selector 14 receives as inputs two different prediction signals prepared in a predictor 13. Subtractor 12 calculates the difference between the selected prediction signal and the multi-level picture signal. This difference, comprising the prediction error, is quantized by a quantizer 15, which is used for limiting the operating level to decrease the amount of information generated. The output of quantizer 15 is supplied to a code converter 16 and an adder 17. The adder 17 adds a quantized prediction error signal from the quantizer 15 and the prediction signal supplied from the selector 14 to form a local decoding signal which is supplied to the predictor 13. By using the local decoding signal, the predictor 13 generates a plurality of prediction signals.

The predictor 13 can utilize either of two prediction schemes, one being a previous value prediction scheme (DPCM) in which prediction is made by using a locally decoded signal from the prior picture element time before and the other being an interframe prediction scheme wherein prediction is made by utilizing a local decoding signal from the prior frame. For both of these schemes predictor 13 can be implemented by a circuit wherein a one-picture-element-delay element is connected in parallel with a one-frame-delay element.

A control signal for the selector 14 can be generated as follows. The two types of prediction signals prepared by the predictor 13 are supplied to the selector 14 and to an optimum prediction function determining circuit 18 which judges as to which one of the two types of the prediction signals is close to the locally decoded signal of the multi-level picture signal supplied from the adder 17 so as to provide a minimized difference. In other words, the circuit 18 grades which one of the prediction schemes is suitable for the given picture element time and transfers the result of grading (in this example, a one-bit signal) to a memory circuit 19.

For example, assuming that the aforementioned prediction function (I) is subject to an in-frame prediction and that the prediction function (II) is subject to an interframe prediction, "0" is outputted when a prediction signal pursuant to the in-frame prediction is closer to the signal value of the locally decoded signal, with "1" outputted in the other case. The memory circuit 19 is constituted by a memory element having a memory capacity of about one line (in the case of television signals, one horizontal scanning line). In accordance with the example shown in FIG. 3, at the present picture element time, information showing the optimum prediction functions corresponding to the previous picture element A and the picture elements B and C of the previous line are supplied in parallel (in this case 3 bits in parallel) to a judging circuit 21 via a signal line 52.

The judging circuit 21 is responsive to the output signals from the memory circuit 19 showing the state of generation of the optimum prediction function of the reference picture elements to determine which one of the in-frame prediction and the interframe prediction should be used for the present picture element, in accordance with the aforementioned method of estimation of the optimum prediction function regarding the present picture element. Thus, the judging circuit 21 decides a signal controlling the selection operation of the selector 14 (for example, where it is judged that an in-frame prediction is to be used, a controlling signal value "0" is produced. On the other hand, when it is judges that the interframe prediction is to be used, a controlling signal value "1" is supplied to the selector 14. The prediction error signal quantized by the quantizer 15 is supplied to the code converter 16 where it is encoded, for example, variable-length encoded and then sent to a transmission line or a recoding medium.

Details of the judging circuit 21 will now be described. Thus, typically, the judging circuit 21 can be constituted by a read only memory (ROM). In this example, a 3-bit signal is supplied to an input address of the ROM and results of statistical judgments of various pictures are prestored in addresses corresponding to patterns of the three bits. Assume now that the results of the statistical judgments are shown by FIG. 4. For the purpose of description, it is supposed that a signal showing the optimum prediction function of the reference picture element A is stored in the least significant bit, a signal representing the reference picture element B is stored in a bit next to the least significant bit, and that a signal representing the picture signal C is stored in the most significant bit. Then the input address corresponding to the state of the reference picture element shown at (7) in FIG. 4, for example, is "110". In this case, since $P_I<0.5$, under this reference picture element state, the prediction function (II), that is, the interframe prediction can be applied to the present picture element. Accordingly, the value written into the input address "110" of the ROM is "1". Values to be written into other input addresses are determined in the same manner. In other words, in the example shown in FIG. 4, values shown in the output column of FIG. 7 are written into respective input addresses of the ROM. In this manner, the judging circuit 21 comprises a table written into the ROM.

With reference to FIG. 6, a decoding apparatus that decodes encoded information will now be described. An encoded multi-level picture signal transmitted over the transmission line or read out from a recording medium is supplied through an input terminal 22 to a code inverter 23 in which a prediction error signal is derived out of the encoded multi-level picture signal, thus effecting inversion of the variable length code into an equal length code for preparation for the succeeding decoding. The prediction error signal inverted into the equal length code by the code inverter 23 is supplied to an adder 24. The adder 24 is supplied with a prediction signal selected by a selector 26 inputted with two types of the prediction signals prepared by a predictor 25 so as to add this prediction signal to the output of the code inverter 23, thereby producing a decoded multi-level picture signal. The decoded multi-level picture signal is simultaneously supplied to a picture signal output terminal 27, the predictor 25, and a determining circuit 28 for determining the optimum prediction scheme. The predictor 25 produces a plurality of prediction signals by utilizing the decoded picture signal. The optimum prediction scheme determining circuit 28 determines an optimum prediction scheme by utilizing the decoded picture signal and the plurality of the prediction signals (in this case, two) from the predictor 25 in the same manner as the determining circuit of the encoding apparatus described in connection with FIG. 5, and the determined result is sent to a memory circuit 29. In the same manner as the memory circuit 19 of the encoding apparatus shown in FIG. 5, the memory circuit 29 sends to a judging circuit 31 a 3-bit (in this example) information representing the optimum prediction scheme at three picture element times. The judging circuit 31 controls the selection operation of the selector 26 in the same manner as the judging circuit 21 of the encoding apparatus. The constructions of the predictor 25, selector 26, the optimum prediction scheme determining circuit 28, the memory circuit 29 and the judging circuit 31 are the same as those of the predictor 13, the selector 14, the optimum prediction scheme determining circuit 18, the memory circuit 19 and the judging circuit 21 of the encoding apparatus, and the connections among these circuit elements are also the same.

As described above, according to this invention, it is possible to estimate, at a high probability, the optimum prediction function for the present picture element based upon the state of occurrence of the optimum prediction functions regarding the reference picture elements, thereby encoding a multivalue picture signal at high efficiency. The invention can be modified as will be described hereinafter.

In the foregoing description, the table for estimating the optimum prediction function of the present picture element was determined by experiment, for example, by using the results of measurement as shown in FIG. 4. In other words, the table for estimating the optimum prediction function of the present picture element was fixed, but it is not always necessary to use a fixed table. Thus, it is also possible to renew or update the table utilized to estimated the optimum prediction function by mesuring the probability of occurrence in which the interframe of the in-frame prediction becomes an optimum function with respect to respective reference picture element patterns shown at (1) to (8) in FIG. 4. This feature is termed "learning performance". This modification will be described in the following. This modification is different from the embodiment described above in only the judging circuits 21 and 31. Since these judging circuits have the same construction, only the judging circuit 21 adapted for this modification will be described with reference to FIG. 8.

In FIG. 8, the output of the memory circuit 19 shown in FIG. 5, that is, a parallel three-bit signal representing the state of the reference picture element is inputted via a signal line 52 to a histogram counter 60 and a table memory 65. The table memory device 65 is constituted by a random access memory and its input addresses and outputs are identical to those of the ROM comprising the judging circuit 21 of the first embodiment. The table memory 65 is written with a table for estimating the optimum prediction function of the present picture element, which has been renewed before inputting a signal representing the state of the reference picture element with respect to the present picture element. The signal representing the reference picture element state which is inputted through signal line 52 is supplied to an input address of the table memory 65 so that this table memory outputs a signal representing a prediction function to be used for the present picture element to a signal line 53. More particularly, when the interframe prediction is used, "1" is outputted, but when the in-frame prediction is used, "0" is outputted. The histogram counter 60 is responsive to the input signal from signal line 52 representing the reference picture element state to count the number of reference picture elements assuming the optimum prediction function subject to either the interframe prediction or the in-frame prediction with respect to each of the reference picture element conditions (in this case, eight conditions shown at (1) to (8) in FIG. 4), thereby preparing a histogram utitized to judge which one of the interframe prediction and the in-frame prediction has a higher probability of becoming the optimum prediction function with reference to each reference picture element condition. The histogram counter 60 is supplied with an address signal showing either one of the reference picture element states through a signal line 67, and the counter 60 sends to a signal line 61 a signal indicating that the frequency of the interframe prediction becomes the optimum prediction function at a reference picture element state designated by the address signal after counting a predetermined number of time units. Also the histogram counter 60 outputs a signal indicating that the frequency of the in-frame prediction becomes the optimum prediction function to a signal line 62. Signals outputted to the signal lines 61 and 62 are inputted to a comparator 63 which compares these inputted signals with each other for sending to the table memory 65 via a signal line 64 a signal "1" when the signal on signal line 61 is larger (in a reference picture element state designated by the address generator 66, the interframe prediction becomes the optimum prediction function at higher frequency, but in the other case sends a signal "0" to the table memory 65. In the table memory 65, the value inputted via signal line 64 is written into an address determined by the signal from the signal line 67 to update the table utilized to estimate the optimum prediction function. By sequentially varying the addresses defined by the signal on signal line 67 from "000" to "111" as illustrated in FIG. 7 each time each of the N (N>1) frames occurs, all contents of the table memory 65 can be periodically renewed or updated. Where writing and reading operations are made independently for the random access memory comprising the table memory, the table can be updated while performing the encoding operation. Immediately after the renewal of the table, the content of the histogram counter 60 is cleared, thereby commencing preparation of a histogram utilized at the time of next table renewal.

Figure 9:
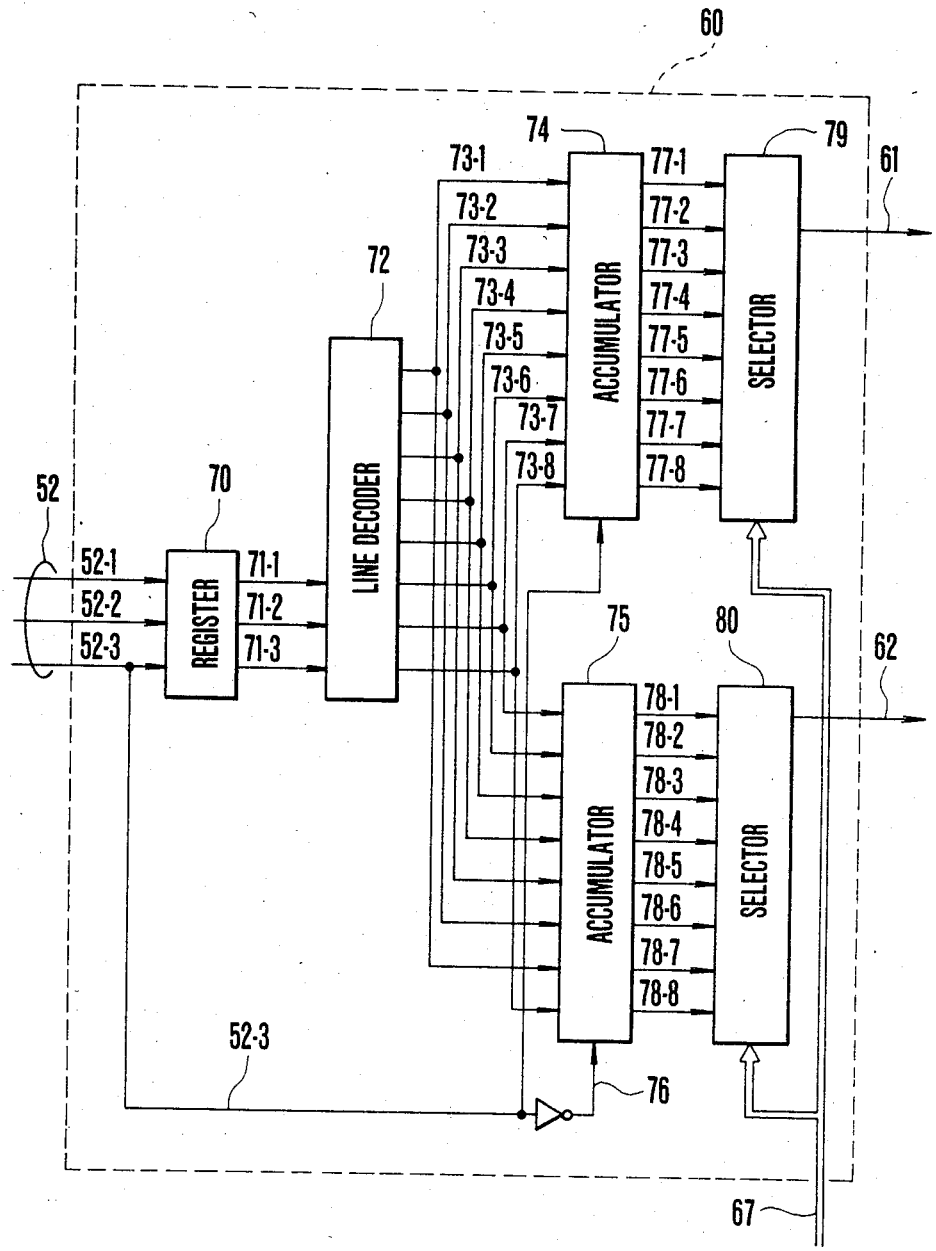
Figure 10:
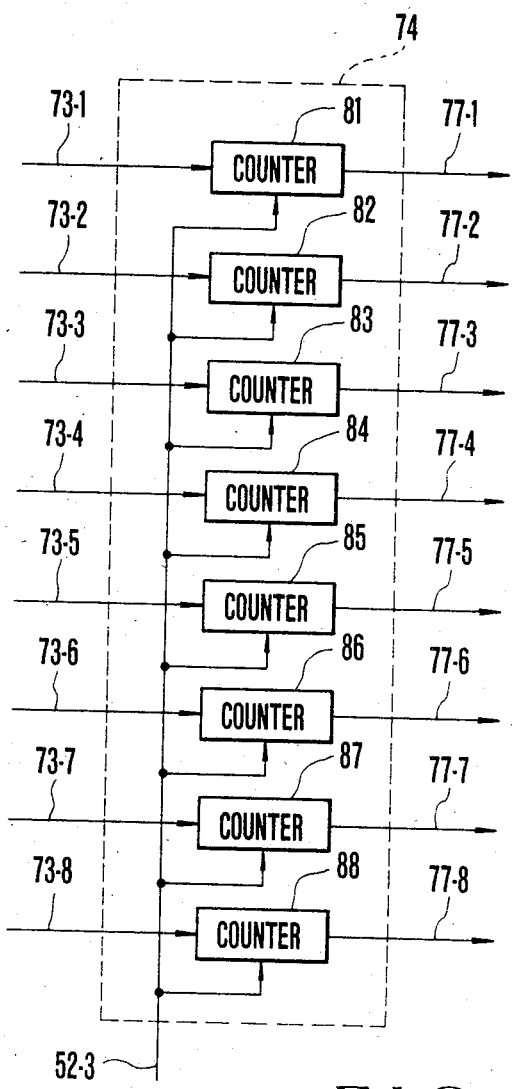
Figure 11:
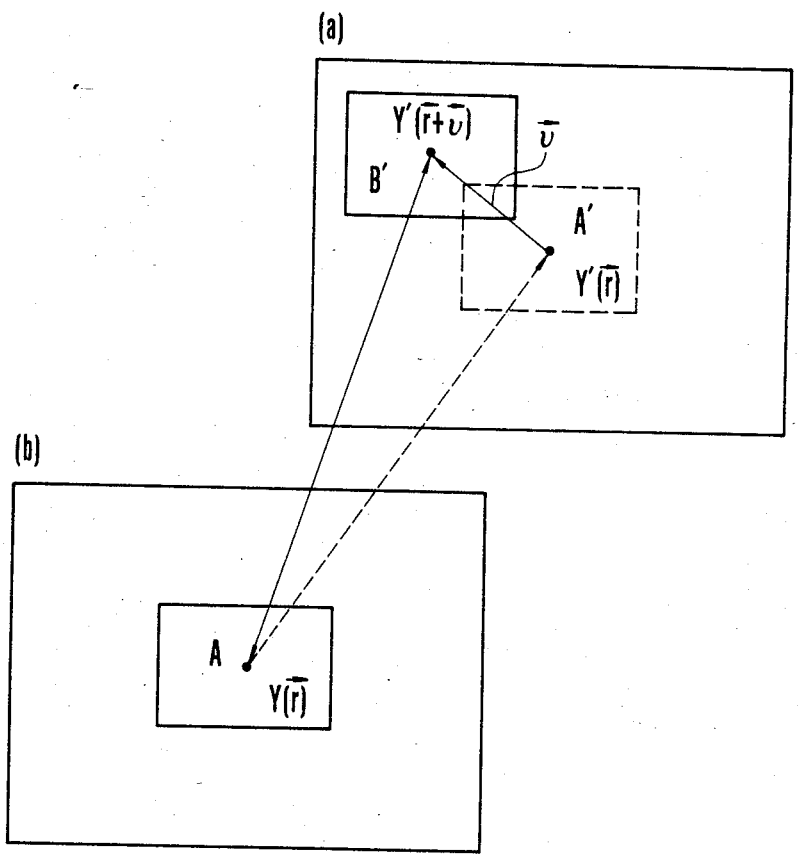
FIG. 11 is a diagramatic representation useful to explain a motion-compensated interframe encoding.

The construction and operation of the histogram counter 60 will be described with reference to FIGS. 9 and 10, in which FIG. 9 is a block diagram for explaining the histogram counter 60 while FIG. 10 is a block diagram showing the construction and operation of an accumulator, one of the constitution elements of the histogram counter 60.

A signal representing the state of the reference picture element inputted through a signal line 52 is inputted to a register 70. As has been described, signal line 52 passes the 3-bit parallel signal showing the optimum prediction functions regarding the reference picture elements A, B and C. In FIG. 9, the signal line is designated as three one-bit signal lines 52-1, 52-2 and 52-3. When the present picture element time is taken as a reference, signal line 52-1 represents an optimum prediction function of the reference picture element C, signal line 52-2 that of the reference picture element B, and the signal line 52-3 that of the reference picture element A.

Signals on signal lines 52-1, 52-2 and 52-3 are respectively delayed one sampling time by the register 70 and the delayed signals are applied in parallel to signal lines 71-1, 71-2 and 71-3. Accordingly, on signal lines 71-1, 71-2 and 71-3 appear signals representing the optimum prediction functions of a picture element one element left to the reference picture element C, a picture element one element left to the reference picture element B and a picture element one element left to the reference picture element A, respectively.

As described, above a signal representing the optimum prediction function of the reference picture element A appears on the signal line 52-3. In other words, on signal lines 52-3, 71-1, 71-2 and 71-3, appear the optimum prediction function of a picture element one sampling time before (previous picture element) and the optimum prediction function of the reference picture element with reference to the previous picture element. Consequently, it is possible to prepare the histrogram in accordance with signals on signal lines 52-3, 71-1, 71-2 and 71-3.

Signals on signal lines 71-1, 71-2 and 71-3 are inputted into a line decoder 71 which applies to an accumulator unit (I) 74 and an accumulator unit (II) 75 after changing to "0" a signal on only one of signal lines 73-1 through 73-8. The accumulator units (i) and (II) have the same construction. As shown in FIG. 10, the accumulator unit (I) 74 is constituted by 8 counters 81 through 88 respectively connected to signal lines 73-1 to 73-8. The accumulator unit (I) is inputted with a signal on signal line 52-3 whereas the accumulator unit (II) is inputted with a signal resulting from inversion of the signal on line 52-3 by an inverter 76. These signals are used as selection signals of the accumulator units (I) and (II). Thus, when the signal on signal line 52-3 is "1" indicating that the optimum prediction function of the previous picture element is an interframe prediction, only the accumulator unit (I) operates; and when the signal is "0", only the accumulator (II) operates. For example, when the signal on signal line 52-3 is "1", the count of a counter supplied with "0" as the input signal thereto is incremented by one among eight counters supplied with signals on signal lines 73-1 through 73-8. The accumulator unit (II) also functions in the same manner when the signal on signal line 76 is "1" (at this time, the signal on signal line 52-3 is "0"). As described above, with respect to each of the reference picture element conditions, the number of picture elements whose interframe predictions become the optimum prediction functions is counted by the accumulator unit (I) 74, whereas the number of picture element shows inframe predictions become the optimum prediction functions is counted by the accumulator unit (II) 75. As described above, a histogram is prepared for judging which one of the interframe prediction and in-frame prediction has a higher probability of becoming the optimum prediction function with regard to each reference picture element condition.

The counts of the eight counters contained in the accumulator unit (I) are respectively read out onto signal lines 77-1 to 77-8 and then supplied to a selector 79. In the same manner, the counts of eight counters in the accumulator unit (II) 75 as respectively read out onto signal lines 78-1 to 78-8 and then supplied to a selector 80. In response to an address signal inputted through signal line 67, each of the selectors 79 and 80 selects one of the eight inputs and delivers the selected signal to signal lines 61 and 62. Thus, a signal representing the frequency of the interframe prediction becoming the optimum prediction function for a designated reference picture element condition appears on signal line 61, whereas a signal representing the frequency of the in-frame prediction becoming the optimum prediction function appears on signal line 62.

As described above, an optimum prediction function judging circuit having a learning performance can be realized.

According to the modified embodiment, it is possible to estimate the optimum prediction function in accordance with the picture image which varies from time to time, thus enabling efficient encoding. Although in the foregoing description, a case wherein two prediction function, were adaptively switched, the invention is also applicable to a case utilizing three or more prediction functions. Furthermore, in the foregoing description, the reference picture elements were set in the same frame as shown in FIG. 3, picture elements of a previous frame closely adjacent, in terms of time, to the present picture element can also be used as the reference picture elements. In the following description, the invention will be descibed as applied to the motion-compensated prediction with the view of improving coding efficiency in the case of scene change. The encoding efficiency of the motion-compensated interframe encoding decreases when a scence changes or a picture signal containing motions exceeding the detection range is inputted, because correct prediction of the television signal of the present frame from the television signal of the previous frame is prevented. In such a case, an inframe prediction (a prediction scheme wherein a television signal is predicted only from a picture element in the same frame) shows a higher encoding efficiency than the motion-compensated interframe prediction.

Consequently, the defects of the motion-compensated interframe encoding scheme can be obviated by the following measures.

(1) At the time of scene change, in-frame prediction is made;

(2) For a picture containing motions exceeding the detection range, an in-frame prediction is made for a television signal representive of a moving object which moves beyond the detection range;

(3) For a television signal representative of a moving object which moves within the detection range and a still object, the motion-compensated interframe prediction is employed.

With these measures, sorting prior to the prediction coding is needed between a picture element estimable by the motion-compensated interframe prediction at a higher efficiency (whereby the prediction error signal becomes small) and a picture element estimable by the in-frame prediction at a higher efficiency. There are the following methods for sorting these picture elements.

According to one method, a prediction error signal according to the motion-compensated interframe prediction is compared with a prediction error signal according to the in-frame prediction so as to use the prediction scheme having smaller prediction error signal. According to this method, it is possible to accurately select a prediction in which the prediction error is minimized (hereinafter called an optimum prediction) from the motion-compensated interframe prediction and the in-frame prediction. With this method, however, it is necessary to transmit information showing which one of the motion-compensated interframe and the in-frame prediction is used, thus lowering the encoding efficiency.

On the other hand, at the time of scene change and in the case of a picture including a motion exceeding the detection range, picture elements which make small the prediction error according to the in-frame prediction attend to be localized. More particularly at the time of scene change, the prediction error according to the in-frame prediction becomes smaller throughout the entire picture. In a picture containing motions exceeding the detection range, the in-frame prediction can also be applied to a portion of the picture which moves beyond the detection range, so as to minimize the prediction error.

Consequently, it is possible to estimate the optimum prediction function for the present picture element by checking which one of the motion-compensated interframe prediction and the in-frame prediction is optimum for picture elements which are located, in terms of time and space, close to the present picture element to be predictively encoded at the present time, that is, the picture elements previously referred to as reference picture elements. The method of estimating the optimum prediction function for the present picture element by using the reference picture elements has already been described with reference to FIGS. 3 and 4.

Figure 12:
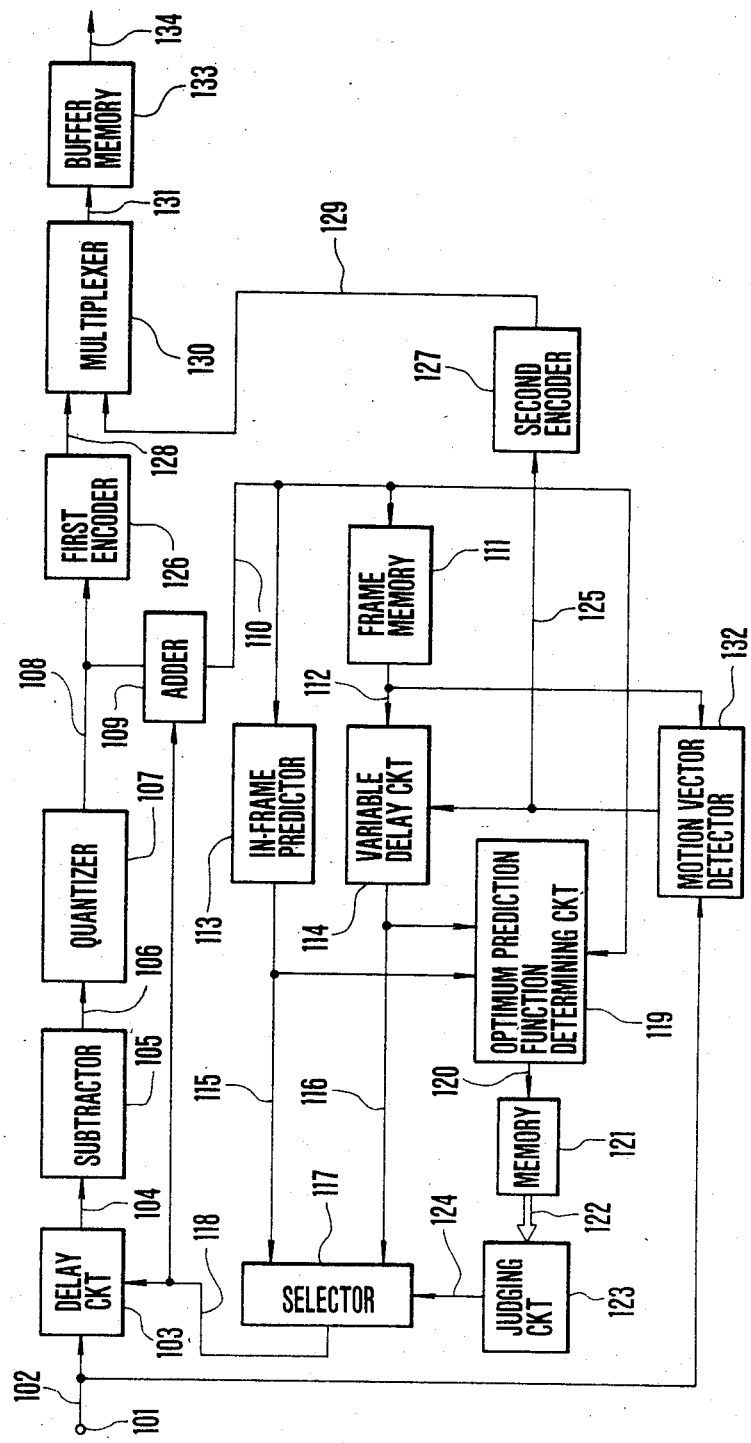
FIG. 12 is a block diagram showing one example of a motion-compensated interframe encoding apparatus according to this invention.

FIG. 12 shows one example of a motion-compensated interframe encoder embodying the invention, in which a digitized television signal is inputted to an input terminal 101. The inputted television signal is sent to a delay circuit 103 and a motion vector detector 132 via a signal line 102. The purpose of the delay circuit 103 is to make to match the timings of the inputted television signal and of a prediction signal on signal line 118 at a subtractor 105, that is, to compensate for the time required for the detection of the motion vector and the generation of the prediction signal. The television signal outputted onto signal line 104 by the delay circuit 103 is subtracted from the prediction signal sent from a selector 117 via signal line 118 in a subtractor 105 and the resulting difference signal, that is, the prediction error signal is applied to a quantizer 107 via signal line 106 to be quantized and the quantized prediction error signal is sent to a first encoder 126 and an adder 109 via signal line 108.

In the adder 109, the quantized prediction error signal is added to a prediction signal fed from signal line 118 so as to be locally decoded. The locally decoded signal is supplied to an in-frame predictor 113, a frame memory 111 and an optimum prediction function determining circuit 119 via signal line 110.

The in-frame predictor 113 is responsive to the locally decoded signal to produce an in-frame prediction signal which is applied to the selector 117 and optimum prediction function determining circuit 119 via signal line 115. The frame memory 111 supplies to a variable delay circuit 114 and the motion vector detector 132 the locally decoded signal from the previous frame via signal line 112.

The motion vector detector 132 detects a motion vector in accordance with the inputted television signal and the locally decoded signal from the previous frame which is inputted through signal line 112, and the detected motion vector is applied to the variable delay circuit 114 and a second encoder 127 via signal line 125.

Since the construction of the motion vector detector 132 is described in detail in U.S. Pat. No. 4,307,420, its description will not be made herein. The variable delay circuit 114 spatially delays the locally decoded signal from the previous frame from signal line 112 in accordance with the direction and magnitude of the motion vector fed from signal line 125. The delayed signal is sent to the selector 117 and the optimum prediction function determining circuit 119 as a motion-compensated interframe prediction signal via a signal line 116.

The optimum prediction function determining circuit 119 compares the in-frame prediction signal on the signal line 115 with the motion-compensated interframe prediction signal on the signal line 116 to judge which one of thus two signals is closer to the locally decoded signal supplied through signal line 110, and the result of judgment (in this example, an one-bit signal) is sent to a memory circuit 121 via signal line 120. For example, where the in-frame prediction signal is closer to the locally decoded signal, a signal "0" is supplied to the memory circuit 121, but in the other case, a signal "1" is sent.

The memory circuit 121 is constituted by a memory element having a capacity of about one horizontal scanning line.

When assuming that the picture elements A, B and C shown in FIG. 3 are used as reference picture elements, the memory circuit 121 supplies in parallel (in this case 3 bits in parallel) signals representing the optimum prediction functions of the reference picture elements A, B and C to a judging circuit 123 via signal line 122. The judging circuit 123 decides which one of the in-frame prediction and the motion-compensated interframe prediction should be used for the present picture element based on a signal representing the state of generation of the optimum prediction function of the reference picture elements fed from the memory circuit 121 in accordance with the previously described method of estimating the optimum prediction function of the present picture element, for sending out a signal controlling the operation of the selector 117 to a signal line 124. For example, when it is decided that the in-frame prediction should be used, a signal "0" is sent, whereas when it is decided that the motion-compensated interframe prediction should be used, a signal "1" is sent.

Thus, the judging circuit 123 has the same construction as the circuit 21 in the previous embodiment.

The selector 117 selects the in-frame prediction signal fed from signal line 115 when the signal on signal line 124 is "0", but selects the motion-compensated interframe prediction signal on signal line 116 when the signal on signal line 124 is "1", and send out the selected signal to signal line 118 as a prediction signal.

The quantized prediction error signal inputted to the first encoder 126 is encoded to have a variable code length and then supplied to a multiplexer 130 via signal line 128. The motion vector inputted to the second encoder 127 is also encoded to have a variable code length and then supplied to the multiplexer 130 via signal line 129. The multiplexer 130 multiplexes the thus encoded prediction error signal and motion vector to write these multiplexed signals in to a buffer memory 132 via signal line 131. The content of the buffer memory 133 is read out at a transmission speed of a transmission path 134 and sent thereto.

The construction and operation of the decoder of the motion-compensated interframe encoding/decoding apparatus according to this invention will be described with reference to FIG. 13.

Figure 13:
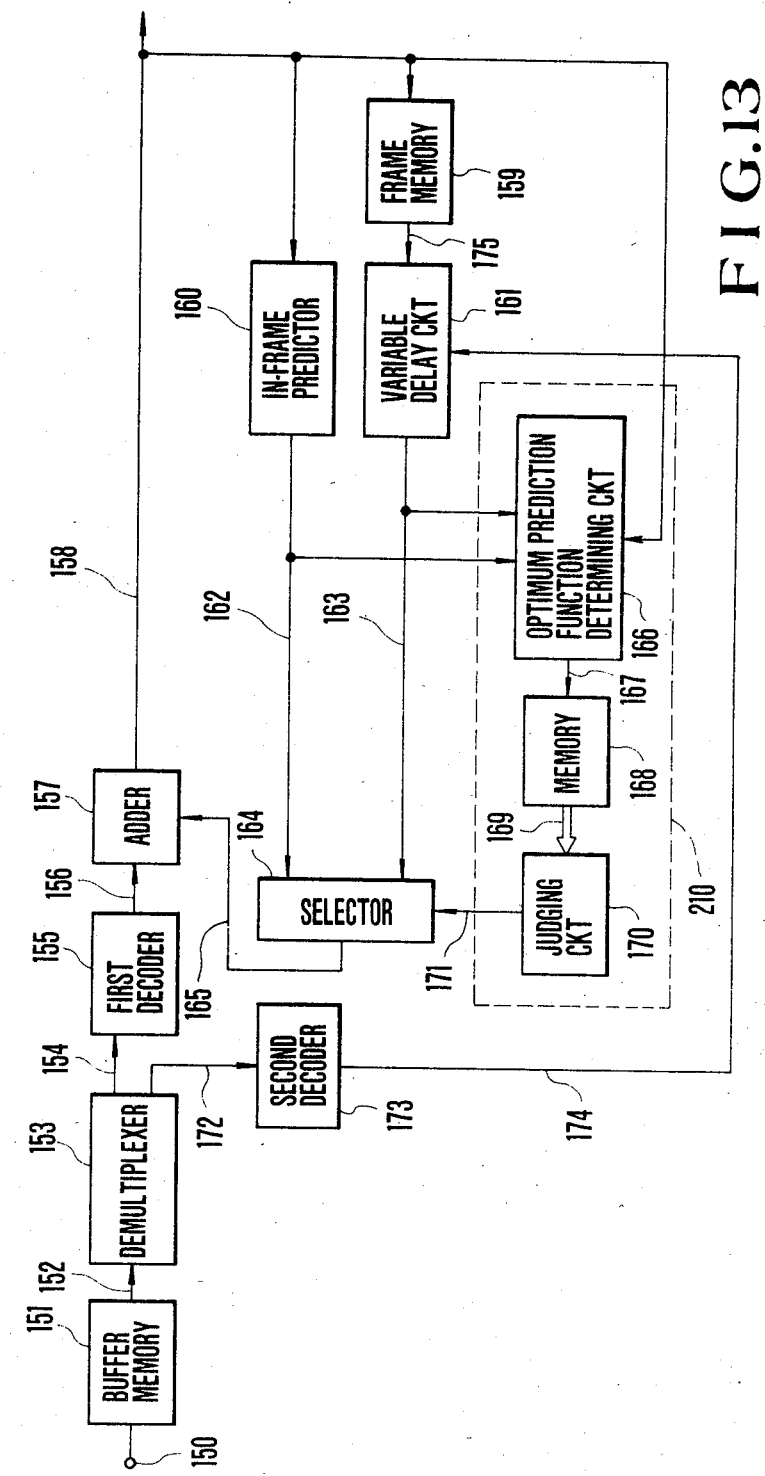
FIG. 13 is a block diagram showing one example of a motion-compensated decoding apparatus of this invention.

In FIG. 13, the codes of the multiplexed prediction error signal and/motion vector sent from the encoder of FIG. 12 are inputted to an input terminal 150 and then written into a buffer memory 151. The content of this buffer memory 151 is inputted to a demultiplexer 153 via signal line 152. In the demultiplexer 153, a code representing the prediction error signal is separated from a code representing the motion vector, and the separated codes are supplied to a first decoder 155 and a second decoder 173 respectively through signal lines 154 and 172. The second decoder 173 decodes the code representing the motion vector to apply the decoded code to a signal line 174. The first decoder 155 decodes the code representing the prediction error signal and sends the decoded code to an adder 157 via signal line 156. In this adder, the prediction error signal is added to a prediction signal fed from a selector 164 through signal line 165, thereby predictively decoding a television signal which is supplied to a signal line 158. The predictively decoded television signal is supplied to an in-frame predictor 160, a frame memory 159 and an optimum prediction function determining circut 166. The in-frame predictor 160 produces an in-frame prediction signal which is supplied to the selector 164 and the optimum prediction function determining circuit 166 via signal line 162. The frame memory 159 supplies the decoded television signal about one frame before to a variable delay circuit 61 via a signal line 175. The variable delay circuit 161 spacially displaces by one motion vector fed from signal line 174, the decoded television signal about one frame before fed from signal line 175 to produce a motion-compensated prediction signal on signal line 163. Thus, this motion-compensated prediction signal is applied to the selector 164 and the optimum prediction function determining circuit 166. In this manner signals to be applied to a dotted line block 210 are generated. Included in this block are the optimum prediction function determing circuit 166, a memory circuit 168 and a judging circuit 170, these circuit elements having the same performance and internal connections as the optimum prediction function determining on circuit 119, memory circuit 121, and judging circuit 123 of the encoder shown in FIG. 12. In the same manner as in the encoder, the operation of the selector 164 is controlled by a control signal produced on a signal line 171 from the judging circuit 170.

As described above, according to these embodiments of this invention, it is possible to eliminate the defect of the motion-compensated interframe encoding apparatus that the encoding efficiency decreases for a picture containing a scene change and motions exceeding the detection range.

Although, in the foregoing description, the motion-compensated interframe prediction was made by using a block matching type disclosed in U.S. Pat. No. 4,307,420, it should be understood that the invention is also applicable to other type of motion-compensated interframe prediction, for example Pel-Recursive type described in a paper of A. N. Netravali and J. D. Robbins, of the title "Motion-Compensated Television Coding: Part I", Bell System Technical Journal, 1979, March.

As in the preceding embodiment, in the application to the motion-compensated interframe prediction, the learning performance described with reference to FIG. 8 can obviously be employed. In this case, the judging circuit 21 having the construction shown in FIG. 8 may substitute for the judging circuit 123 for FIG. 12 or the judging circuit 170 of FIG. 13.

What is claimed is:

1. An adaptive, predictive, encoding/decoding method for a multi-level picture signal applicable to an adaptive, predictive, encoding/decoding system wherein;

on a transmission side, a single prediction signal, estimated as an optimum signal among prediction signals generated pursuant to a plurality (M) of prediction functions, is adaptively selected and the multi-level picture signal is predictively encoded by using the selected prediction signal, and on the receiving side, the multi-level picture signal is predictively decoded by procedures opposite to those on the transmission side;

said method composing the steps of:

utilizing a plurality (N) of picture elements, encoded during a prior time period and located near the present picture element to be encoded during a present time period, as reference picture elements;

detecting which one of said M prediction functions is an optimum prediction function, based on prediction error, for each reference picture element;

forming $M^N$ reference picture element states based on the result of a detection of the optimum prediction function for each of the N picture elements;

selecting when determining a prediction signal for the present picture element on the basis of the $M^N$ reference picture element states, one prediction function, which is the optimum prediction function, having a high degree of probability in each reference picture element state, thereby causing each of said $M^N$ states for a prior period of time to one to one correspond to the prediction function for the present picture element; and determining the prediction function to be utilized for the present picture element during the present time period based upon said one to one correspondence when any one of said reference picture element states occurs.

2. Adaptive predictive encoding apparatus of a multi-level picture signal wherein one prediction signal estimated as an optimum prediction signal is adaptively selected for each picture element among prediction signals generated pursuant to a plurality (M) of prediction functions, and predictively encoding said multi-level picture signal by utilizing the selected prediction signal, said apparatus comprising:

means for producing a plurality (M) of prediction signals;

means for selecting a single prediction signal out of said M prediction signals;

means for encoding a prediction error signal between said selected prediction signal and said multi-level picture signal;

means for locally decoding said multi-level picture signal in accordance with said prediction error signal and said selected prediction signal;

means for generating a signal representing an optimum prediction function having a minimum difference between each of said M prediction signals and said locally decoded multi-level picture signal;

means for producing a group of signals representing $M^N$ reference picture element states from said optimum prediction function signal generating means said group of signals being foumed by signals showing said optimum prediction functions of a plurality (N) of reference picture elements which have already been encoded and located close to the present picture element to be encoded at the present time, and for one to one corresponding each of said $M^N$ states to a prediction function estimated to be optimum for the present picture element at a high degree of probability at least before the present time; and control means for determining a prediction function utilized for the present picture element in accordance with said one to one correspondence and said group of signals representing said reference picture element states, thereby causing said selecting means to select a prediction signal generated pursuant to the thus determined prediction function.

3. Adaptive predictive decoding apparatus wherein one prediction signal is adaptively selected for each picture element among prediction signals generated pursuant to a plurality (M) of prediction functions and an adaptively and predictly encoded multi-level picture signal is predictively encoded by utilizing said selected prediction signal, said apparatus comprising:

means for producing M prediction signals;

means for selecting a single prediction signal among said M prediction signals;

means for decoding a multi-level picture signal in accordance with said selected prediction signal and said predictively encoded multi-level picture signal;

means for generating a signal representing an optimum prediction function having a minimum difference between each of said M prediction signals and said decoded multi-level picture signal;

means for producing a group of signals representing $M^N$ reference picture element states from said optimum prediction function signal generating means said group of signals being formed by signals showing said optimum prediction functions of a plurality (N) of reference picture elements which have already been decoded and located near the present picture element to be decoded at the present time, and for one to one corresponding each of said $M^N$ states to a prediction function estimated to be optimum at a high degree of probability for the present picture element at least before the present time; and control means for determining a prediction function utilized for the present picture element in accordance with said one to one correspondence and said group of signals representing said reference picture element states, thereby causing said selecting means to select a prediction signal generated pursuant to the thus determined prediction function.

4. A method of motion compensated interframe encoding and decoding comprising the steps of:

on a transmission side, selecting a motion-compensated prediction function having a high encoding efficiency of at least one picture element for a motion of a television signal among a plurality (M+1) of prediction functions having different encoding efficiencies depending upon direction and magnitude of the motion of the television signal, each of said prediction functions generating a prediction signal by using locally decoded signals of picture elements presenting in picture frames preceding a frame in which the present picture element to be encoded at the present time exists;

detecting which one of said (M+1) prediction functions is the optimum prediction function for each of N reference picture elements by using a prediction error as a reference, a plurality (N) of previously encoded picture elements near said present picture elements being used as said N reference picture elements for the present picture element, whereby, for each picture element, a prediction function estimated to be optimum is adaptively selected among (M+1) prediction functions prepared from M in-frame prediction functions which present in the same frame said present picture element and generate prediction signals in accordance with locally decoded signals of previously encoded picture elements, and said motion-compensated prediction function determined for said at least one picture element;

preparing reference picture element states representing $(M+1)^N$ states from results of said detections for said N picture elements, thus determining a prediction function utilized for the present picture element, wherein, for each of said $(M+1)^N$ states and said prediction function for said present picture element, a prediction function which becomes, at a high probability, the optimum prediction function for respective states, so as to one to one correspond each of said $(M+1)^N$ states to said prediction function for the present picture element at least before the present time;

determining a prediction function utilized for the present picture element in accordance with said one to one correspondence when any one of said reference picture element states occurs;

predictively encoding said television signal by using a prediction signal generated pursuant to the thus determined prediction function; and on a receiving side, determining a prediction function utilized for the present picture element among (M+1) prediction functions including said motion-compensated prediction function of said at least one picture element and said M in-frame prediction functions, according to substantially the same processings as those utilized on the transmission side; and predictively decoding said television signal by using a prediction signal generated pursuant to the thus determined prediction function.

5. The method according to claim 4 wherein said at least one picture element comprises a block of a predetermined number of consecutive picture elements.

6. Apparatus for effecting motion-compensated interframe encoding comprising:
- means for detecting a motion of a television signal by using at least one picture element;
- means for generating a motion-compensated prediction signal, the motion thereof being compensated for by a motion-compensated prediction function determined by said detected motion;
- means for generating M in-frame prediction signals in accordance with locally decoded values of picture elements contained in the same frame as the present picture element to be predictively encoded at the present time, said M in-frame prediction signals having M in-frame prediction functions;
- means for selecting a prediction signal among (M+1) prediction signals including said motion-compensated prediction signal and said M in-frame prediction signals;
- means for predictively encoding said television signal by encoding a prediction error signal between said selected prediction signal and said television signal;
- means for locally decoding said television signal in accordance with said selected prediction signal and said prediction error signal;
- means for producing a signal representing an optimum prediction function given to a prediction signal selected from said (M+1) prediction signals for said television signal, and having a small difference with respect to said locally decoded television signal;
- means for producing a group of signals representing $(M+1)^N$ reference picture element states which are formed by signals representing said optimum prediction functions for respective reference picture elements comprising a plurality (N) of previously encoded picture elements located close to said present picture element;
- means for one to one corresponding each of said $(M+1)^N$ states to a prediction function estimated to be optimum at a high probability for the present picture element, at least before the present time; and
- control means for determining a prediction function utilized for the present picture element according to said one to one correspondence and for causing said selecting means to select a prediction signal generated pursuant to said prediction function thus determined.

7. The apparatus according to claim 6 wherein said at least one picture element comprises a block of a predetermined number of consecutive picture elements.

8. A motion compensated interframe decoding apparatus wherein a prediction signal is adaptively selected for each picture element from a motion-compensated prediction signal prepared by compensating for a motion of a television signal by using a picture element and decoded signals of picture elements located in the same frame as the present picture element to be predictively decoded at the present time, and the predictively encoded television signal is predictively decoded by using said selected prediction signal, said apparatus comprising:
- means for producing (M+1) prediction signals including said motion-compensated prediction signal and M in-frame prediction signals;
- means for selecting one prediction signal among said (M+1) prediction signals;
- means for predictively decoding said television signal in accordance with said predictively encoded television signal and said selected prediction signal;
- means for producing an optimum prediction signal given with a prediction signal selected from said (M+1) prediction signals corresponding to said decoded televison signal and having a small difference with respect thereto;
- means for generating a group of signals representing $(M+1)^N$ reference picture element states, said group of signals being outputted from said means for generating said signal representing the optimum prediction functions and formed by signals representing said optimum prediction functions of a plurality (N) of previously encoded reference picture elements located near said picture elements;
- means for one to one corresponding each of said $(M+1)^N$ states and a prediction fucntion estimated to be optimum, at a high probability, for the present picture element, a least at the present time; and
- control means, which when a group of signals representing one of said reference picture element states is inputted, one to one corresponds each one of said $(M+1)^N$ states to said prediction function for the present picture element, whereas when another signal group representing another of said reference picture element states is inputted, determines a prediction function utilized for the present picture element according to said one to one correspondence so as to cause said selecting means to select a prediction signal generated pursuant to the prediction function thus determined.

* * * * *